United States Patent [19]

Winston

[11] 4,359,265
[45] Nov. 16, 1982

[54] CONTROLLED DIRECTIONAL SCATTERING CAVITY FOR TUBULAR ABSORBERS

[75] Inventor: Roland Winston, Chicago, Ill.

[73] Assignee: University Patents, Inc., Norwalk, Conn.

[21] Appl. No.: 113,155

[22] Filed: Jan. 18, 1980

[51] Int. Cl.³ .............................................. G02B 5/10
[52] U.S. Cl. ................... 350/296; 126/438; 126/442; 350/299
[58] Field of Search ............................ 350/293–296, 350/299; 126/438, 439, 442, 443

[56] References Cited

U.S. PATENT DOCUMENTS

| 4,059,093 | 11/1977 | Knowles et al. | 126/438 X |
| 4,120,565 | 10/1978 | Rabl et al. | 126/438 X |
| 4,215,674 | 8/1980 | Riggs et al. | 126/438 |

FOREIGN PATENT DOCUMENTS 54-40342  3/1979  Japan .................................. 126/439

*Primary Examiner*—F. L. Evans
*Attorney, Agent, or Firm*—David N. Koffsky; A. Sidney Alpert; Jerome M. Teplitz

[57] ABSTRACT

A specular cavity is provided in which an optical receiver is emplaced. The cavity is provided with a series of V groove-like indentations (or pyramidal-type indentations) which redirect energy entering between the receiver and cavity structure onto the receiver. The aperture opening of each V groove is less than half the cavity opening and in most preferred embodiments, much less than half. This enables the optical receiver to be emplaced a distance g from the cavity wherein $0.414r < g \leq r$ (r is the radius of the receiver) leading to an attendant increase in energy concentration capability.

6 Claims, 6 Drawing Figures

U.S. Patent  Nov. 16, 1982  Sheet 1 of 2  4,359,265
PRIOR ART
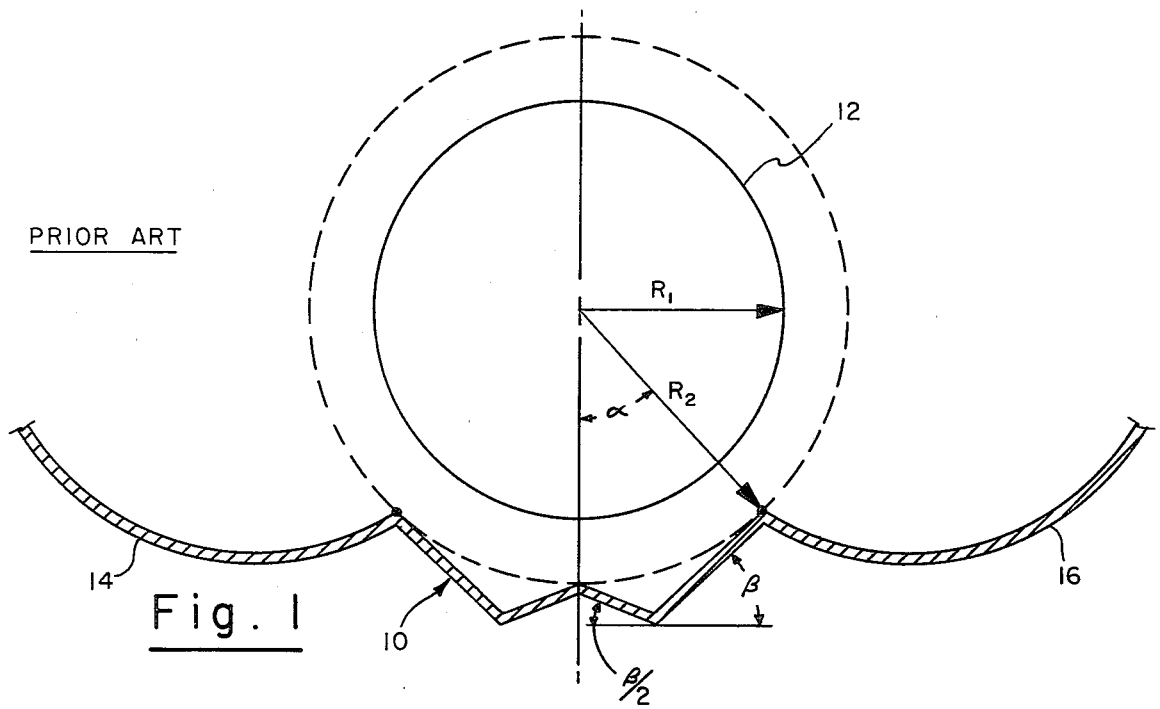
Fig. 1
Fig. 2
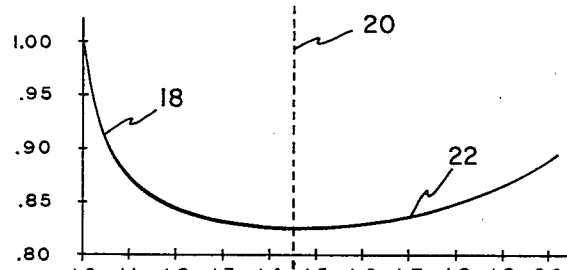
CPC' (MODIFIED) / CPC (CUSP)
Fig. 5
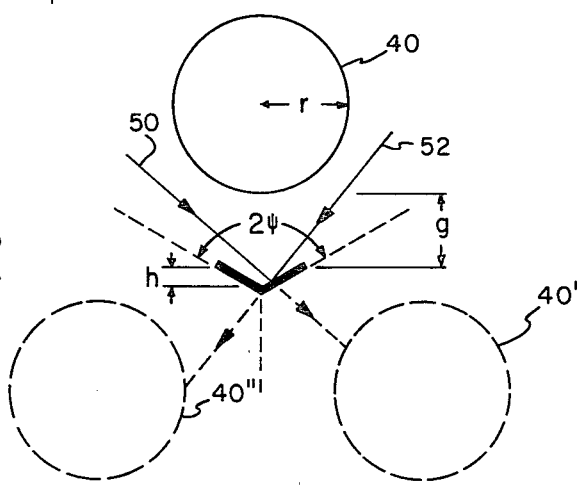

CONTROLLED DIRECTIONAL SCATTERING CAVITY FOR TUBULAR ABSORBERS

BACKGROUND OF THE INVENTION

This invention relates to radiant energy collection and more particularly to a cavity design for reducing losses inherent in certain radiant energy collectors.

This invention relates to the subject matter of my copending patent application, Ser. No. 113,169; assigned to the same assignee and filed on even date herewith now abandoned, and superseded by continuation patent application Ser. No. 230,137, filed Jan. 30, 1981.

It is well-established that radiation which is partially collimated with an angular divergence of $\pm\theta$ can be concentrated on a receiver without transmission loss by the maximum concentration of $C_{max=sin \theta^{-1}}$ through the use of nonimaging reflectors known generically in the art as compound parabolic concentrators. These concentrators are disclosed in my U.S. Pat. Nos. 3,923,381; 4,002,499; and 4,033,638; the disclosures of which are incorporated herein by reference. The compound parabolic concentrator (CPC) includes an energy receiver positioned between two trough-like sidewalls which reflect substantially all incident energy received over a predetermined included angle ($\pm\theta$) onto the energy receiver. The aforementioned patents describe how the reflective sidewalls should be configured to achieve the maximal energy concentration. For instance, in U.S. Pat. No. 4,002,499, it is shown, for a tubular energy receiver, that the lowermost portions of the sidewalls form an involute of the shape of the energy receiver. It is important to note that the energy receiver shown in the '499 patent is the theoretical "optical design" receiver, and a practical design dictates that a larger-than-theoretical receiver shape be emplaced between the sidewalls to ensure that placement tolerances, minor wall malformations, etc. do not significantly hinder the energy concentrator. More recently, it has been shown desirable to encompass the receiver in a vacuum bottle-like structure wherein the outermost surface is concentric to the inner receiver; is transparent; and encloses a vacuum between itself and the inner surface of the receiver (which itself may be coated with an energy selective surface).

To strictly meet the requirements of maximum concentration and no transmission loss in a CPC, the reflector surfaces should touch the optical design receiver. At times this is not practical—especially when a larger-than-theoretical receiver is employed or when the receiver is enclosed in a transparent vacuum jacket.

In fact, it is desirable in most constructions that the actual receiver be offset somewhat from the reflector walls to prevent mechanical interferences when they are assembled. This offset reduces the efficiency of the system.

W. R. McIntire of the Argonne National Laboratory has developed a cavity/reflector design for the region below a tubular absorber. The McIntire cavity, for gaps between the cavity and the absorber of up to approximately half of the optical receiver radius, eliminates some of the losses referred to above. That design is shown in FIG. 1 and utilizes a trough-shaped cavity 10 positioned beneath the optical receiver 12. The "W" design (four linear segments) of cavity 10 ensures that no energy rays can enter the region between receiver tube 12 and cavity 10 without being reflected onto receiver 12. $R_1$ is the radius of the circular cross section of the optical receiver, and $R_2$ is the maximum distance which cavity 10 can be separated from the center of optical receiver 12. McIntire shows that for the four-segment cavity 10, $R_2$ should be no larger than $\sqrt{2}R_1$.

When a McIntire-type structure is combined with a CPC structure having sidewalls 14 and 16, its capability to concentrate energy is degraded somewhat in comparison to the cusp-type CPC concentrator shown in U.S. Pat. No. 4,002,499. This relationship is shown in FIG. 2 where is plotted the ratio of the cusp-type CPC concentrator to a CPC modified as shown in FIG. 1. Along the x axis is plotted the ratio of $R_2/R_1$. The portion of curve 18 which is to the left of dotted line 20 shows the degradation of concentration for the reflector shown in FIG. 1 as cavity 10 is moved further away from optical receiver 12.

One problem with the four-segment cavity 10 is that it must be placed quite close to the optical receiver for it to accomplish its function. Since practical receiver structures are constructed considerably larger than their optical design size and are also often enclosed in vacuum jackets which further increase their diameter, that structure may not result in a practical solution.

It is therefore an object of this invention to provide an optical trough cavity which provides enhanced energy concentration ability.

It is a further object of this invention to provide an energy trough cavity/reflector which may be placed at a distance greater than $\sqrt{2}R_1$ away from an optical receiver.

It is still another object of this invention to provide an optical reflecting cavity which may be used either in conjunction with a CPC structure or with imaging-type structures.

SUMMARY OF THE INVENTION

A specular cavity is provided in which an optical receiver may be emplaced, which cavity has special properties for redirecting radiant energy onto the receiver. The cavity is provided with a series of V groove-like indentations (or pyramidal-type indentations) which redirect energy entering between the receiver and the cavity structure onto the receiver. The aperture opening of each V groove is less than half the cavity opening and in preferred embodiments, much less than half. The angular subtense of the receiver, as seen from the aperture of the V groove, is $\geq 60°$. This enables the cavity to be emplaced a sufficient distance from the receiver to achieve an increase in effective energy trapping capability.

BRIEF DESCRIPTION OF THE DRAWINGS

FIG. 1 is a sectional drawing of the prior art detailing a retroreflective cavity.

FIG. 2 is a chart which depicts the change in concentration of the system of FIG. 1 as the ratio of the distance to the cavity to the radius of the optical receiver is modified.

FIG. 5 is a construction useful in deriving the interrelationships between a V-shaped reflective segment and an energy receiver.

DETAILED DESCRIPTION

Figure 3:
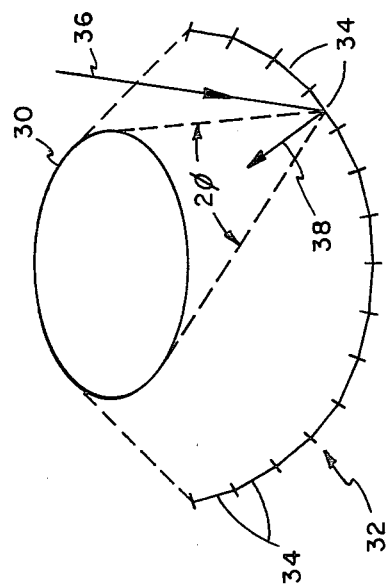
FIG. 3 is a schematic drawing of a retroreflective cavity constructed in accordance with the invention.

Referring to FIG. 3, receiver 30 is emplaced in a cavity 32 whose wall segments 34 have the specific property that radiation incident on a segment 34 from outside the angular subtense of the receiver ($2\phi$) is scattered (or redirected) onto the receiver. For instance, light beam 36, when incident upon segment 34, will be redirected towards receiver 30 along the line indicated by arrow 38.

Figure 4:
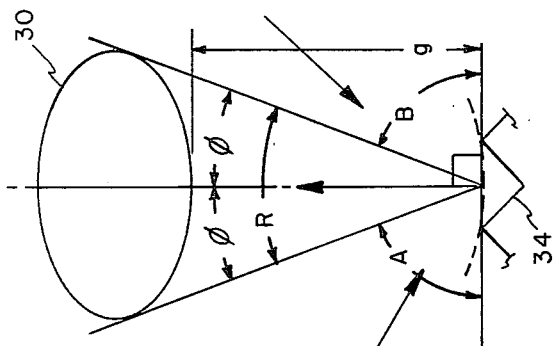
FIG. 4 is a construction which details the method for deriving the requisite dimensional relationships of the invention.

The detailed construction of each scattering segment 34 is shown in FIG. 4. As aforestated, the angular subtense of receiver 30, when viewed from segment 34, is $2\phi$. It will be noted that segment 34 is actually the aperture of a V trough which has mirrored sides capable of reflecting incident energy.

In order to determine the distance g which can separate aperture 34 from the nearest point of receiver 30, it is necessary to understand that it is a requisite of aperture 34 that it reflect all of the energy coming in from solid angles A and B and redirect it within the solid angle R. The second law of thermodynamics requires that the extent of solid angle R must be equal to or greater than the sum of the extents of solid angles A and B (based upon the assumption that this is a reflecting system). It can be shown that the following angular relationships exist:

$$R = 2 \sin \phi S \quad (1)$$

(where S = aperture dimension of segment 34)

$$A = (\sin 90 - \sin \phi) S \quad (2)$$

$$B = (\sin 90 - \sin \phi) S \quad (3)$$

The derivation of equations (1)–(3) can be found in "The Optics of Nonimaging Concentrators" by Welford and Winston, Academic Press, 1978, Section 2.7, pp. 20–25.

As above stated, the second law of thermodynamics requires that:

$$R \geq A + B \quad (4)$$

$$R \geq (1 - \sin \phi) 2S$$

$$2 \sin \phi S \geq (1 - \sin \phi) 2S$$

$$\sin \phi \geq \tfrac{1}{2}$$

$$\phi \geq 30° \quad (5)$$

Equation (5) shows that $\phi$ can be no less than 30°, and therefore, the allowable gap between receiver 30 and aperture 34 is thus constrained. For example, for a cylindrical receiver of radius r, the relationship indicates that the gap distance must be $g \geq r$. In other words, receiver 30 can be emplaced as far away from aperture 34 as r. The importance of this can be seen by referring back to FIG. 2, and in specific, portion 22 of the curve shown therein. It has been found, in accordance with the above analysis, that as the distance $R_2$ increases in excess of $\sqrt{2} R_1$, the effective concentration commences to increase to a maximum of 88.5% when $R_2 = 2 R_1$. Thus, by increasing the distance between the receiver and the aperture 34 and reducing the size of the aperture, a substantial increase in efficiency of solar concentration can be achieved.

It has been found that a reflecting V groove of appropriate opening angle and height will provide the necessary reflection capability called for by equation (5). The construction of such a V groove is shown in FIG. 5. To illustrate, a cylindrical receiver 40 of radius r is chosen, and the gap g between the receiver and the aperture of the groove is chosen close to r. Using the method taught by Williamson [D. E. Williamson, "Cone Channel Condensor Optics", *Journal of the Optical Society of America*, Vol. 42, pp. 712–715, (1952)], angular constructions are created equivalent in angle to the opening angle of the V groove (in this case 118°) and receivers 40' and 40" are constructed in the identical relationship as receiver 40 has to the V groove. By then tracing light beams 50 and 52 and projecting them through the legs of the V groove, it can be seen that they intersect receivers 40' and 40". This indicates that light beams 50 and 52, when reflected by the V groove, will in fact be redirected onto the surface of receiver 40. It is apparent from FIG. 5, that radiation from outside the solid angle of the receiver 40 will invariably be reflected onto receiver 40.

More generally, it is possible to work out limits on the opening angle ($2\psi$) and the height (h) of the V groove for any gap distance where the gap distance (g) is less than r. Thus, for grooves of a small height (h), where h is much less than the radius r of the receiver (h $\ll$ r), the V groove constraints can be determined as follows:

(1) The distance between the apex of the V groove and the center of the receiver is chosen and must be less than 2r, for a circular receiver (g < r).

(2) The angle of the V groove, ($2\psi$), has the following limits:

$$\left. \begin{array}{l} 2\psi \leq 90° + \phi \\ 2\psi \geq 180° - 2\phi \end{array} \right\} \text{ where } \phi > 30° \quad (6)$$

(3) The maximum height (h) of the V groove can then be determined from the following relationship:

$$h \leq r \cot^2 \psi + g(\cot^2 \psi - 1)/2 \quad (7)$$

The above relationship provides the maximum height (h) of the V groove, however, of course, it can always be truncated without loss of performance. In case the condition h $\ll$ r is not met, $\phi$ should be replaced by $\alpha = \sin^{-1}[r/(r+g+h)]$ in Equation (6) where $\alpha$ is the half angle subtended by tangents to the receiver drawn from the apex of the V groove. Thus, one first chooses $\alpha$, then $\psi$, and finally h to complete the design.

Figure 6:
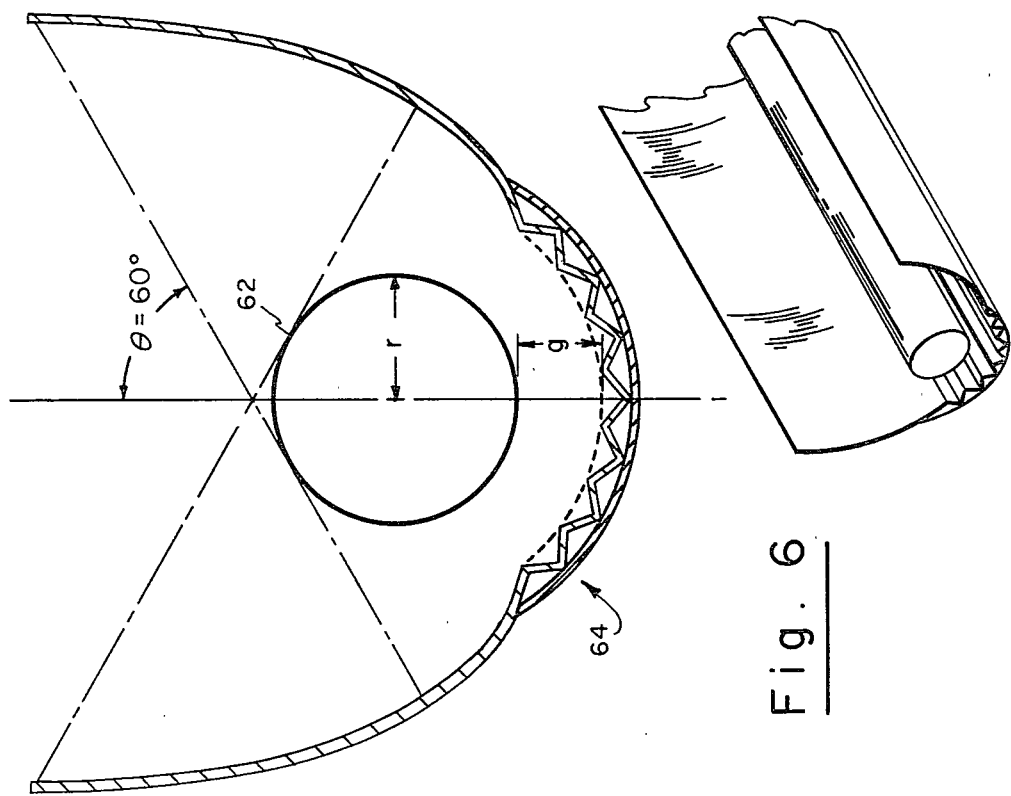
FIG. 6 is a section and a partial isometric of a reflecting trough constructed in accordance with the invention and mated with a CPC.

A solar concentrator designed in accordance with the above is shown in FIG. 6. The concentrator is designed for a gap (g) which is close to the radius (r) of receiver 62. The concentrator is of the CPC type and is designed for a wide angle of acceptance $\theta = 60°$. Ray tracing will show that all rays entering the gap g between receiver 62 and cavity 64 will be rereflected onto receiver 62.

While the cavity reflector has been described as having V grooves in a trough-like construction, a "dimpled" configuration will also be operable so long as the dimples have an inverted pyramidal shape. In addition, while it is preferable that the sidewalls be straight, some concavity can be accommodated, without a resultant loss in efficiency.

I claim:

1. In combination with a tubular energy receiver, a trough-like concave cavity having an opening adapted to be oriented towards a source of radiant energy and a plurality of substantially V shaped reflecting segments arranged along the periphery of said cavity, each segment provided with an energy aperture, each said reflecting segment arranged to reflect substantially all radiant energy incident thereon towards said energy receiver; the improvement wherein the dimension of each said energy aperture is less than half the dimension of said cavity opening and each said energy aperture is placed a distance from the closest point of said receiver so that the angular subtense $2\phi$ of said receiver as seen from said energy aperture is $\geq 60°$.

2. The invention as defined in claim 1 wherein said tubular energy receiver is circular in cross section and has a radius r, and wherein $0.414r < g < r$.

3. The invention as defined in claim 2 wherein the aperture of each segment is substantially less than half the dimension of said cavity opening.

4. The invention as defined in claim 2 wherein said opening of said cavity is mated with a pair of reflective sidewalls which are shaped to reflect substantially all energy incident thereon, from a predetermined, included angle $\pm \theta$ with a centerline between said reflective sidewalls, onto said cavity opening and energy receiver.

5. In combination with a tubular energy receiver, a trough-like concave cavity having an opening adapted to be oriented towards a source of radiant energy, said cavity defined by a plurality of reflecting segments, each said reflecting segment arranged to reflect substantially all radiant energy incident thereon towards said energy receiver; the improvement wherein each said segment is comprised of an energy aperture and a pair of reflecting walls arranged in a V-shape, and each energy aperture being placed at a distance from the closest point of said receiver such that the angular subtense $2\phi$ of said receiver as seen from said energy aperture is $\geq 60°$, each said pair of V-shaped reflecting walls reflecting all energy incident thereon from outside said angular subtense $2\phi$ within said angular subtense $2\phi$.

6. The invention as defined in claim 5 wherein said opening of said cavity is mated with a pair of reflective sidewalls which are shaped to reflect substantially all energy incident thereon, from a predetermined, included angle $\pm \theta$ with a centerline between said reflective sidewalls, onto said cavity opening and energy receiver.

* * * * *